F. S. CARR.
FASTENER.
APPLICATION FILED MAR. 8, 1921.
1,433,790.
Patented Oct. 31, 1922.
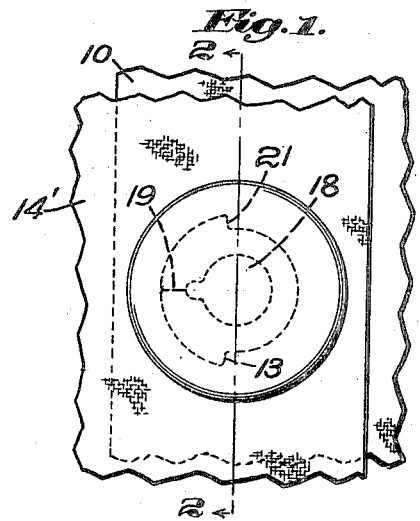
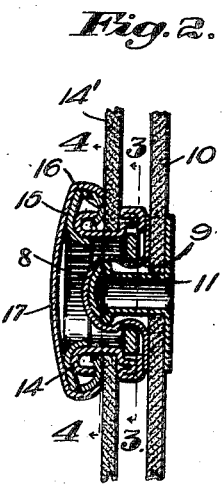
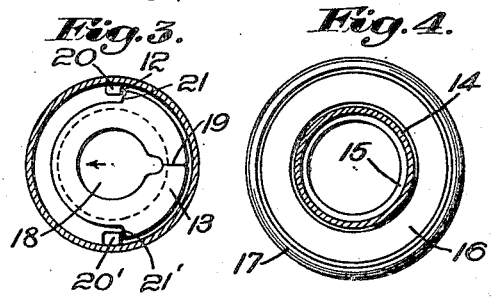
Inventor:
Fred S. Carr,
by Emery Booth Janney & Varney
Attys.

Patented Oct. 31, 1922.

1,433,790

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

Application filed March 8, 1921. Serial No. 450,740.

*To all whom it may concern:*

Be it known that I, FRED S. CARR, a citizen of the United States, and a resident of Newton, in the county of Middlesex, State of Massachusetts, have invented an Improvement in Fasteners, of which the following description, in connection with the accompanying drawings, is a specification, like characters on the drawings representing like parts.

This invention pertains to improvements in separable fasteners. It is among the objects of the invention to provide a separable fastener of the stud and socket type of simple and rugged construction, in which the parts are not likely to become separated under lateral strain.

In the drawings, which show a preferred form of one illustrative embodiment of my invention:—

Figure 1 illustrates a preferred form of fastener, the stud and socket being applied to marginal portions of flexible carriers, such as the fabric or leather of a glove;

Fig. 2 is a section on the line 2—2 of Fig. 1;

Fig. 3 is a section on the line 3—3 of Fig. 2;

Fig. 4 is a section on the line 4—4 of Fig. 2;

Fig. 5 is a plan view of a preferred form of stud-securing rivet prior to assembly thereof with the stud;

Fig. 6 illustrates diagrammatically the relative positions of the constructions of the socket, the socket-carrying fabric or leather and the socket-securing cap prior to the securing together of these parts; and Fig. 7 illustrates diagrammatically the preferred form of stud, the stud-carrying fabric or leather and the stud-securing rivet prior to assembly of these parts.

Referring to the drawings, which show an illustrative embodiment of one form of my invention particularly well adapted for use where the stud and socket are secured to flexible carrying elements by metallic securing means, such, for instance, as where applied to leather or fabric in connection with glove manufacture, I have shown a stud including a head 8 and a reduced neck portion 9, the stud being secured to the stud-carrying fabric 10, which may be any flexible carrier such as cloth or leather, by a stud-securing rivet 11 passing through the fabric 10 and upset within the head 8 of the stud so that the fabric is gripped between the stud base flange and the flange of the stud-securing rivet. The preferred form of socket illustrated includes a casing 12 which preferably, as illustrated, contains a spring element 13 and which, where adapted to be metallically secured to the socket carrying fabric 14', may include a projecting portion 14, herein shown as tubular and adapted to be expanded within a socket-securing cap presenting an anvil portion 15 and a clinching portion 16, which may be and preferably are covered and concealed by a socket cap 17. The spring 13 is preferably flat and formed from sheet metal providing a stud-receiving opening or aperture 18, and preferably providing a slit or slot 19 at one side thereof, preferably as illustrated at that side thereof which is not normally subjected to lateral strain between the stud and socket. The spring 13 is preferably normally spaced away from the casing 12 in the direction of strain throughout a portion of its periphery at least as great as that lying beyond a line tangential to the stud-receiving aperture at the strain-receiving side thereof. In the preferred form of my invention illustrated, I have spaced the spring 13 away from the casing 12 by spacing means located substantially on diametrically opposite sides of the stud-receiving aperture of the spring. The preferred form of spacing means illustrated, including struck-up portions or buttons 20, 20', are adapted to engage abutting surfaces 21, 21' of the spring 13. These abutting surfaces may conveniently be provided by making the spring 13 at the side thereof toward the slit or slot 19 of a greater width than the portion of the spring opposite the slit or slot. To promote desired positioning of the socket relative to the socket-carrying fabric or leather, I may provide a recess connected with the stud-receiving aperture, this recess being adapted to be engaged by a lug or pin projecting from a part of a socket-attaching tool, the relative arrangement of these parts preferably being such that the notch will be located at that side of the fastener out of the normal line of strain and hence bring the thin side of the fastener spring into the normal line of strain between stud and socket. In gloves and the like, the normal line of strain is usually perpendicular to and toward the adjacent margin of the socket-carrying fabric.

Where stud and socket are attached in the preferred manner, the direction of strain of the stud on the socket is in the direction of the arrow shown in Fig. 3. This brings the abutting faces 21, 21' of the spring into engagement with the abutments 20, 20' of the casing and, the neck of the stud bearing against that portion of the spring between these abutments which is spaced away from the casing, the tendency is to prevent the spring from expanding in such a way as to release the stud therefrom, the resistance of the spring to stud-releasing enlargement increasing as lateral strain between stud and socket is increased. The stud and socket are, however, preferably proportioned so that separation thereof one from the other may be comparatively readily effected by a pull on the free edge of the overlying fabric, though separation of stud and socket may more easily be effected when there is little if any lateral strain between stud and socket in the direction indicated.

It will be understood that while the specific fastener illustrated is of the metallic-secured type, nevertheless the advantages of my improved fastener may be availed of to a large extent in other types of fastener, such, for instance, as the type ordinarily applied to carrying fabrics by sewing and the like. It will also be understood that while my invention is primarily useful in connection with securing together fabrics, this word being used generically to include flexible carrying mediums of all kinds including leather, rubber, etc., my invention is nevertheless of use in fastenings which may be rigid or comparatively rigid as distinguished from flexible.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims:

1. A fastener comprising, in combination, a stud having a head and a neck, and a socket including a casing and a sheet metal spring element in said casing, said spring element providing a stud-receiving aperture and said spring normally spaced away from said casing in the direction of strain throughout a portion of its periphery at least as great as that lying beyond a line tangential to the stud-receiving aperture at the strain-receiving side thereof.

2. A fastener comprising, in combination, a stud having a head and a neck, and a socket including a casing and a spring in said casing, said spring having a stud-receiving aperture, and said spring and socket providing engaging abutments for maintaining said spring spaced away from said casing in the direction of strain, said abutments located on opposite sides of the stud-receiving aperture in the spring.

3. A socket for separable fasteners including a casing and a spring in said casing, said spring providing a stud-receiving opening and having a slit or slot at one side to permit resiliency, the portion of said spring at the side thereof toward said slit or slot being of a greater width than the portion of said spring opposite said slit or slot.

4. A socket for separable fasteners including a casing and a spring in said casing, said spring providing a stud-receiving opening and having a slit or slot at one side to permit resiliency, the portion of said spring at the side thereof toward said slit or slot being of a greater width than the portion of said spring opposite said slit or slot, and abutments on the casing between the thicker and thinner portions of said spring.

5. A socket for separable fasteners including a casing and a spring in said casing, said spring providing a stud-receiving opening and having a slit or slot at one side to permit resiliency, the portion of said spring at the side thereof away from said slit or slot spaced away from the casing and projections on the casing engaging abutments on said spring to maintain such spacing, said projections and abutments located adjacent a plane passing through the center of the stud-receiving opening and perpendicular to the normal line of strain on the socket when in use.

6. A socket for separable fasteners including a spring of sheet metal providing a stud-receiving aperture and a slit or slot from the stud-receiving aperture to the periphery of the spring, said slit or slot on the side of the spring away from the line of strain thereon when in use, said slit or slot providing a recess connected with the stud-receiving aperture permitting location of the socket in a determined relation to an attaching tool thereby to provide, when the socket is attached to its carrying fabric, for location of said slit or slot on the side of the socket away from the normal line of strain.

7. A socket for separable fasteners including a casing and a spring in said casing, said spring providing a stud-receiving aperture, said spring generally ring-shaped and providing an annulus of varying width, and an extension from said aperture extending into a wider portion of said annulus.

8. A socket for separable fasteners including a stud-engaging spring of sheet metal intended to receive in a predetermined direction the strain between stud and socket when engaged with each other, and metallic securing means for securing said socket to its carrying fabric, said socket presenting a locating surface for engagement with a securing tool, thereby to insure a predetermined relation between the socket and securing tool during the operation of securing said socket to its carrying fabric.

9. A socket for separable fasteners including a casing and a spring in said casing, said casing presenting spring-retaining flanges at each side of the spring and an extension from one of said flanges for securing the socket to its carrying fabric, and locating means for locating said spring, rotatively considered, relative to said casing, said socket presenting means for locating the socket in predetermined relation, rotatively considered, to an attaching tool.

10. A socket for separable fasteners including a casing and a spring in said casing, said casing presenting spring-retaining flanges at each side of the spring and an extension from one of said flanges for securing the socket to its carrying fabric, said casing having projections engaging said spring to prevent rotation thereof relative to said casing and for spacing said spring away from one side of said casing.

11. A socket for separable fasteners including a casing and a spring in said casing, said casing presenting spring-retaining flanges at each side of the spring and an extension from one of said flanges for securing the socket to its carrying fabric, one of said flanges having projections engaging said spring to prevent rotation thereof relative to said casing and for spacing said spring away from one side of said casing.

12. A socket for separable fasteners including a casing and a spring in said casing, said casing presenting spring-retaining flanges at each side of the spring and an extension from one of said flanges for securing the socket to its carrying fabric, the flange carrying said extension having projections engaging said spring to prevent rotation thereof relative to said casing and for spacing said spring away from one side of said casing.

13. A spring for separable fasteners providing a stud-receiving aperture and an annulus surrounding said aperture, the periphery of said annulus at one side having an arc of greater radius than the arc of the periphery of said annulus at the opposite side.

14. A spring for separable fasteners providing a stud-receiving aperture and an annulus surrounding said aperture, the periphery of said annulus at one side having an arc of greater radius than the arc of the periphery of said annulus at the opposite side, and relatively abrupt shoulders between the said two sides of the periphery.

15. A socket for separable fasteners including a casing a sheet metal spring in said casing having a stud-receiving opening, said spring generally annular in peripheral shape but the annulus wider at one side of the stud-receiving aperture than at the opposite side thereof, said annulus split at the wider side thereof, and means for spacing the narrower side of the spring from said casing.

In testimony whereof, I have signed my name to this specification.

FRED S. CARR.